(12) United States Patent
Engman

(10) Patent No.: US 11,268,580 B2
(45) Date of Patent: Mar. 8, 2022

(54) ELECTRICALLY DRIVEN CLUTCH ACTUATOR

(71) Applicant: KA Group AG, Zürich (CH)

(72) Inventor: Jimmy Engman, Kongsberg (NO)

(73) Assignee: KA Group AG, Zürich (CH)

( * ) Notice: Subject to any disclaimer, the term of this patent is extended or adjusted under 35 U.S.C. 154(b) by 0 days.

(21) Appl. No.: 17/251,574

(22) PCT Filed: Jun. 13, 2018

(86) PCT No.: PCT/EP2018/065618
§ 371 (c)(1),
(2) Date: Dec. 11, 2020

(87) PCT Pub. No.: WO2019/238224
PCT Pub. Date: Dec. 19, 2019

(65) Prior Publication Data
US 2021/0246951 A1    Aug. 12, 2021

(51) Int. Cl.
*F16D 28/00* (2006.01)
*F16D 48/06* (2006.01)

(52) U.S. Cl.
CPC ........... *F16D 28/00* (2013.01); *F16D 48/064* (2013.01); *F16D 2500/1023* (2013.01); *F16D 2500/10412* (2013.01); *F16D 2500/3026* (2013.01)

(58) Field of Classification Search
CPC .................. F16D 28/00; F16D 48/064; F16D 2500/10412; F16D 2500/1023; F16D 2500/3026
See application file for complete search history.

(56) References Cited

U.S. PATENT DOCUMENTS

| 6,050,379 A | 4/2000 | Lyon |
| 2006/0283683 A1 | 12/2006 | Miller |

(Continued)

FOREIGN PATENT DOCUMENTS

| EP | 3073152 A1 | 9/2016 |
| GB | 2279124 A | 12/1994 |

(Continued)

OTHER PUBLICATIONS

International Search Report for Application No. PCT/EP2018/065618 dated Mar. 1, 2019, 3 pages.

*Primary Examiner* — David J Hlavka
(74) *Attorney, Agent, or Firm* — Howard & Howard Attorneys PLLC

(57) ABSTRACT

The invention relates to an electrically driven clutch actuators (1) for actuating the clutch of a transmission of a vehicle. An actuator comprises a spindle nut (11) on a spindle (9) and a pressure piece (13) displaceable relative to the spindle nut (11) and coupled to the spindle nut by a biasing spring (15). By rotation of the threaded spindle under a driving force of an electric motor (5), the spindle nut (11) compresses the biasing spring (15) and displaces the pressure piece (13) to disengage the clutch. A latching mechanism (16) is configured to limit displacement of the spindle nut away from the pressure piece under the force of the expanding biasing spring when the driving force is reduced below a predetermined level. Further, a control unit is described that reduces the driving force in response to a trigger condition to reduce power consumption in the clutch disengaged state.

15 Claims, 3 Drawing Sheets

(56) References Cited

U.S. PATENT DOCUMENTS

2007/0169578 A1\* 7/2007 Christensen ........ F16H 25/2021
                                                    74/89.37
2016/0273595 A1\* 9/2016 Shioiri .................... F16D 28/00
2016/0377126 A1   12/2016 Essenmacher
2017/0353109 A1\* 12/2017 Tanaka ................ H02M 3/1584

FOREIGN PATENT DOCUMENTS

| WO | 2017091433 A1 | 6/2017 |
| WO | 2017129595 A1 | 8/2017 |
| WO | 2017129610 A2 | 8/2017 |

\* cited by examiner

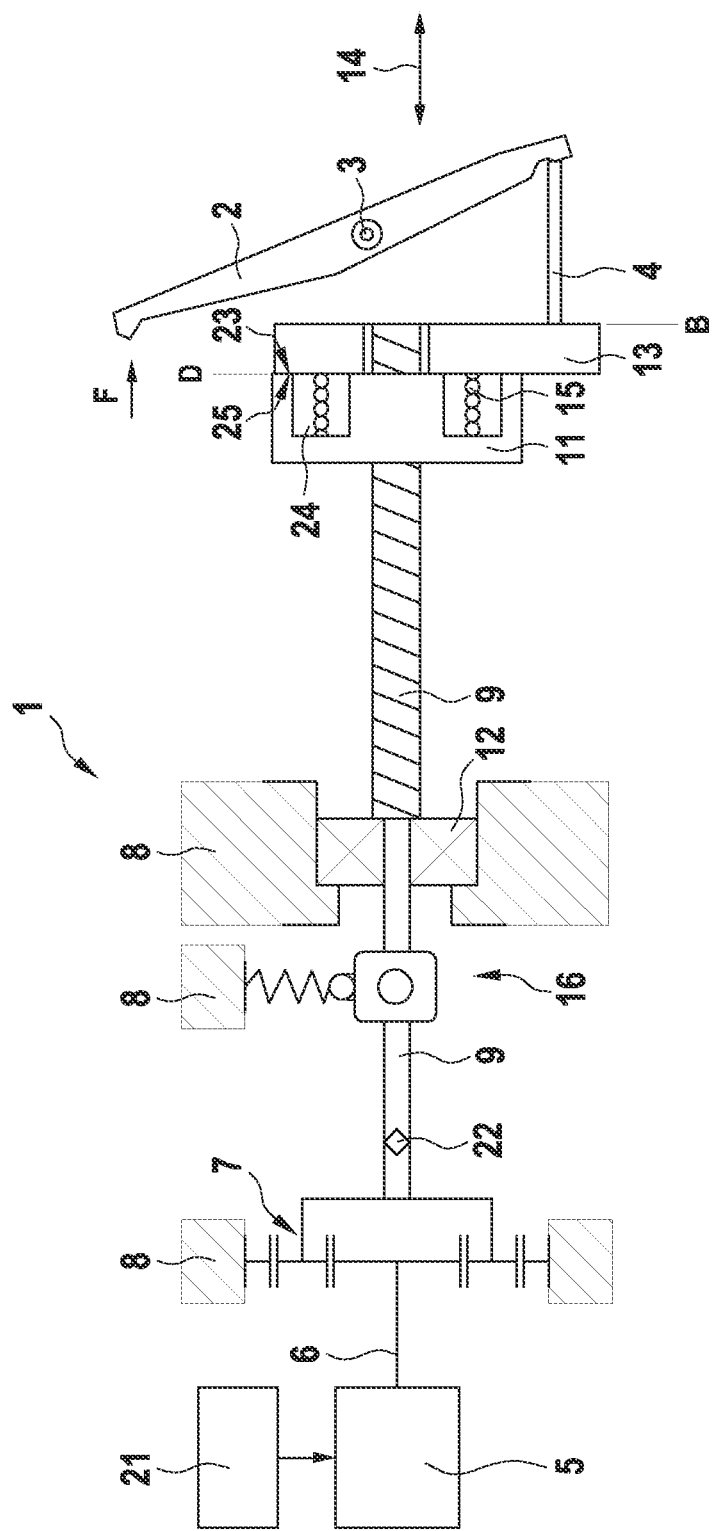

ELECTRICALLY DRIVEN CLUTCH ACTUATOR

The present application is a U.S. National Stage Patent Application of PCT Serial No. PCT/EP2018/065618, filed on Jun. 13, 2018, the entire disclosure of each is hereby incorporated by reference.

FIELD OF THE INVENTION

The invention relates to electrically driven clutch actuators for actuating the clutch of a transmission of a vehicle, comprising a pressure piece that is axially movable between a first and a second position corresponding to engaging and disengaging of the clutch, respectively, wherein the pressure piece is driven from the first into the second position by a spindle drive that comprises a threaded spindle rotationally driven by an electric motor, and a spindle unmounted on the threaded spindle and being axially displaceable by rotation of the threaded spindle. The spindle nut and the pressure piece are displaceable relative to each other in an axial direction, and are coupled to each other by a biasing spring interposed between the spindle nut and the pressure piece such that by rotation of the threaded spindle under a driving force of the electric motor, the spindle nut compresses the biasing spring and displaces the pressure piece towards the second position to disengage the clutch. When the driving force provided by the electric motor is reduced below a predetermined level, the pressure piece is returned to the first position by the restoring force of the clutch and the biasing spring expands to displace the spindle nut away from the pressure piece.

The invention also relates to an electrically driven clutch actuator for actuating the clutch of a transmission of a vehicle, wherein the clutch actuator comprises a threaded spindle supported by one or more roller bearings and rotationally driven by an electric motor and a spindle nut mounted on the threaded spindle and being axially displaceable by rotation of the threaded spindle from a clutch engaging position into a clutch disengaging position corresponding to engaging and disengaging of the clutch, respectively, against the restoring force of the clutch, and wherein the clutch actuator further comprises a control unit that activates and controls an electric motor to apply a driving force to the threaded spindle, wherein the control unit is configured to hold the spindle nut in the clutch disengaging position with a first value of the driving force.

BACKGROUND OF THE INVENTION

Clutch actuators are used in automotive vehicles such as trucks or cars for engaging and disengaging a clutch upon actuation by a driver. Such engagement or disengagement of a clutch is needed when the drive shaft of an engine has to be connected to or disconnected from the gearbox input shaft, e.g. in order to accelerate a vehicle from a stop position or in order to change a gear whilst driving. Manual clutch actuators used to be hydraulically coupled to a pedal positioned in the cabin ow the vehicle. Upon actuation of the pedal by the driver an actuation force was hydraulically transmitted to the clutch actuator, e.g. the clutch lever. Nowadays, electrically driven clutch actuators are state of the art, which are connected to the pedal in the cabin via a cable or under use of a wireless connection. The force needed to actuate the clutch is generated electronically by the clutch actuator upon actuation of the pedal by the driver.

US 2006/0283683 A1 describes an electrically driven clutch actuator for actuating the clutch of a transmission of a vehicle having a rotatable but axially fixed spindle on which is mounted an axially movable but rotatable fixed spindle nut to form a gear mechanism with the threaded spindle that converts a rotational movement of threaded spindle into a linear movement of the spindle nut. The spindle nut carries the disengagement bearing (also called release bearing) of the clutch, and is movable between a two positions in axial direction, one axial position corresponding to the engaged state of the clutch and the other axial position corresponding to the disengaged state of the clutch. Upon displacement of the spindle nut from the clutch engaging position into the clutch disengaging position, the disengagement bearing disengages the clutch to interrupt the torque transfer. In this state of the art actuator the spindle drive is directly connected to the clutch.

Other constructions known in the art comprise a force transmitting mechanism between the disengagement bearing of the clutch and the electric actuator. Force transmitting mechanisms can often be found in the form of hydraulic systems to transmit the actuation force of the clutch actuator to the release mechanism of the clutch, e.g. the clutch lever, which is coupled to the disengagement bearing. Other mechanical devices use a plunger or the like to transmit the actuation movement of the clutch actuator to the clutch. As the clutch actuator shifts the disengagement bearing, the clutch spring exerts a restoring force on the clutch actuator. When the driving force of the clutch actuator is reduced below a predetermined level, the clutch actuator is reset into the clutch engaging state by the restoring force of the clutch spring.

Electrically driven clutch actuators utilize an electric motor and, on a regular basis, a gearing mechanism, e.g. a planetary gear set, between the electric motor and the spindle to overcome the reset force of the clutch and to maintain the clutch in the disengaged state against the restoring force of the clutch. However, maintaining the clutch in the disengaged state is energy consuming and generates a considerable amount of heat in the electric motor, which constantly provides torque against the restoring force of the clutch, making necessary the use of powerful and large, expensive electric motors.

Moreover, engaging and disengaging the clutch is often connected with wear of the disengagement bearing which is constantly switched between a loaded and an unloaded state. Attempts to address this problem have been made by applying a constant preload on the clutch by interposing a biasing spring between the spindle nut and an axially displaceable pressure piece whose axial displacement is transferred to the clutch for actuating the same. The pressure piece is axially displaceable relative to the spindle nut and the threaded spindle between a first and a second position and is pushed axially by the spindle nut under compression of the biasing spring placed therebetween to actuate the clutch. When the spindle nut is in the clutch engaging position, the pressure piece is biased to act on the clutch mechanism, e.g. the clutch lever by the biasing spring and thus provides a preload on the disengagement bearing to reduce wear of the disengagement bearing. Problems occur when the power supply to the electric motor is interrupted, e.g. when the vehicle is turned off. When powered off, the electric motor that positions the spindle nut in the clutch disengaging position no longer provides a force against the compressed biasing spring and the spindle nut is pushed backward as the biasing spring expands. When the vehicle is started again, it takes a considerable amount of time for the electric motor to move the pressure piece and the spindle nut into the respective starting positions, which lengthens the "power-on-time" of the entire transmission and clutch system of the vehicle. This is considerably power consuming due to the additional way of travel and the additional time to bring the clutch system into the "ready" state does not meet the customer's demands.

It is an object of the invention to provide an electrically driven clutch actuator that provides a reliable and energy efficient actuation of the clutch.

SUMMARY OF THE INVENTION

The above object is achieved by an electrically driven clutch actuator for actuating the clutch of a transmission of a vehicle as defined in claim. Further, the object of the invention is solved by an electrically driven clutch actuator for actuating the clutch of a transmission of a vehicle as defined in claim 8. Preferred embodiments of the invention are set out in the dependent claims.

According to the invention, the electrically driven clutch actuator for actuating the clutch of a transmission of a vehicle, comprises a pressure piece that is axially movable between a first and a second position corresponding to engaging and disengaging of the clutch, respectively, wherein the pressure piece is driven from the first into the second position by a spindle drive that comprises a threaded spindle rotationally driven by an electric motor, and a spindle nut mounted on the threaded spindle and being axially displaceable by rotation of the threaded spindle, wherein the spindle nut and the pressure piece are displaceable relative to each other in an axial direction, and are coupled to each other by a biasing spring interposed between the spindle nut and the pressure piece such that by rotation of the threaded spindle under a driving force of the electric motor, the spindle nut compresses the biasing spring and displaces the pressure piece towards the second position to disengage the clutch, and wherein when the driving force provided by the electric motor is reduced below a predetermined level, the pressure piece is returned to the first position by the restoring force of the clutch and the biasing spring expands to displace the spindle nut away from the pressure piece. The invention provides a latching mechanism that is configured to limit displacement of the spindle nut away from the pressure niece under the force of the expanding biasing spring such that the biasing spring is held in pre-load or pre-tensioned state so that the biasing spring exerts a preload on the clutch disengagement mechanism, e.g. the clutch lever and the clutch disengagement bearing. Moreover, the spindle nut remains in position when the power supply to the electric motor is interrupted so that the power-on-time of the system is reduced significantly. This is an important functionality for customers who demand quick responses of the vehicle to their control inputs.

Similar to the pressure piece, the spindle nut is moveable between a clutch engaging position and a clutch disengaging position corresponding to engaging and disengaging states of the clutch, respectively. Both, the pressure piece and the spindle nut, are axially guided by guiding means that prevent rotation but allow axial displacement, e.g. by a guiding rail provided within a housing. In turn, the threaded spindle that drives the spindle nut is rotationally supported within the housing by means, e.g. by roller bearings, that allow the threaded spindle to rotate but not to displace in axial direction.

According to yet a further embodiment of the invention, the latching mechanism comprises first latching means that are firmly connected to the rotatable threaded spindle or the axially displaceable spindle nut. Further, the latching mechanism comprises second latching means adapted to engage with the first latching means. The second latching means may be provided on a housing section of the electric actuator in which the spindle nut and the second acing means are accommodated.

According to further embodiment of the invention, the latching mechanism, in particular the first and second latching means, comprise a detent recess and a detent lug, wherein one of the detent recess and the detent lug is biased in the direction of engagement with the other of the detent recess and the detent lug. For example, the detent lug may be provided in the form of a spring loaded detent cam configured to engage with a detent recess, detent groove or the like, to provide a retaining mechanism that stops the spindle and the spindle nut from further movement under the force of the biasing spring.

According to further embodiment of the invention, the latching means include a detent portion that is firmly connected to or is provided on the threaded spindle and that has at least one detent recess, preferably more than one detent recess, on its outer circumferential surface to retain the threaded spindle in a rotational position by engagement between the detent portion and the detent lug. Thereby, the threaded spindle may be stopped at a predetermined rotational position and the clutch actuator can be held stationary by the latching mechanism by providing a holding torque that overcomes the preload force of the biasing spring. When the clutch actuator is then powered on again, the components are in the same position as in the power-off state. When a plurality of detent recesses is provided, the threaded spindle can be retained at various predetermined rotational positions. This allows for exact rotational positioning of the threaded spindle and axial positioning of the spindle nut and the pressure piece. The detent portion may be provided, e.g., in the form of a detent disk having a number of detent recesses on its outer circumferential surface. The detent lug is preferably spring biased into engagement with the detent portion.

According to further embodiment of the invention, the latching mechanism is configured such that it is releasable by the driving force provided by the electric motor. In other words, the latching mechanism is adapted to automatically disengage when torque or axial thrust above a predetermined threshold value is exerted on one of the first or second latching means.

In accordance with a further embodiment of the invention, the clutch actuator comprises a sensor arrangement configured to detect the rotational position of the threaded spindle and/or the axial position of the spindle nut and/or the axial position of the pressure piece. Detecting the exact position of the clutch actuator components significantly contributes to determining the clutch position and the clutch condition. Consequently, calibration measures to identify the absolute or relative positions of the clutch actuator components and/or the clutch components can be reduced and the power-on-time of the system is significantly reduced.

The sensor arrangement may include Hall-effect sensors that detect an analogous angle or increment sensors that detect the number of magnetic pulses over an angle of rotation of the threaded spindle. Hall-effect sensors may be formed by a sensor part that is preferably fixed to the housing to provide better wiring options and by one or more sensing magnets that are arranged on the movable component, e.g. the threaded spindle.

In accordance with a further embodiment of the invention, the sensor arrangement includes a rotary encoder, preferably an absolute rotary encoder configured to detect absolute rotations of the threaded spindle. The use of an absolute rotary coder is considerably cost effective since the latching mechanism limits the possible displacement of the spindle nut. An absolute rotary encoder is sufficient to detect the position of the spindle nut which is threaded on the threaded spindle in a cost effective and space saving way, because displacement of the spindle nut beyond the clutch engaging position is prevented.

The object of the invention is further solved by an electrically driven clutch actuator for actuating the clutch of a transmission of a vehicle, the clutch actuator comprising a threaded spindle supported by one or more roller bearings and rotationally driven by an electric motor, a spindle nut mounted on the threaded spindle an being axially displaceable by rotation of the threaded spindle from a clutch engaging position into a clutch disengaging position corresponding to engaging and disengaging of the clutch, respectively, against the restoring force of the clutch, and a control unit for activating the electric motor to apply a driving force to the threaded spindle, in particular in response to a command input by an operator or operating system, wherein the control unit is configured to hold the spindle nut in the clutch disengaging position with a first value of the driving force. According to the invention, the control unit is configured such that, when the spindle nut is held in the clutch disengaging position with said first value of the driving force, in response to a trigger condition the control unit reduces the driving force to a second value, the second value of the driving force being above a threshold value at which the spindle nut moves towards the clutch engaging position under the restoring force of the clutch, i.e. at which the spindle nut begins to move relative to the threaded spindle.

The term "roller bearings" refers to bearings that carry loads by placing rolling elements, such as balls or rollers, between two bearing rings called races. The relative motion of the races causes the rolling elements to roll. Various types of roller bearings may be utilized in the invention, for example, ball bearings having balls as rolling elements or tapered roller bearings that use conical rollers that run on conical races.

Regularly, the one or more roller bearings are axially loaded by the restoring force of the clutch. The one or more roller bearings to support the spindle shaft is of the type that is able to support at least some axial load exerted by the clutch onto the spindle shaft, and the roller bearings are arranged such that the axial load by the restoring force of the clutch acts on the roller bearings through the threaded spindle. When the clutch actuator is held in the disengaged state of the clutch, i.e. the spindle nut is in the clutch disengaging position, and the clutch actuator system is in a stationary state, the components of the clutch actuator provide static friction, e.g. between the rollers and the races of the roller bearings and in a threaded engagement between spindle nut and the threaded spindle. This static friction is utilized by the present invention in an advantageous manner. The internal static friction of the clutch actuator assists the electric motor in holding the clutch actuator system stationary against the restoring force of the clutch. Therefore, it is possible to unload the electric motor to a certain degree when the clutch actuator is in a stationary state. In other words, when the control actuator is in a stationary condition with the spindle shaft and the spindle nut not moving relative to each other, the control unit reduces, in response to a trigger condition, the driving force to utilize the static friction of the clutch actuator to hold the spindle nut in the clutch disengaging position.

Reducing the driving force under specific conditions reduces power consumption and is in particular beneficial for hybrid truck applications, where it is wanted to disengage the engine shaft from the drive shaft for pure electric driving. Moreover, the heating up of the electric motor that holds the clutch in the disengaged state is significantly reduced so that the dimensions of the electric motor can be significantly smaller.

The first value of the driving force may be associated with the value at which the electric motor operates to disengage the clutch under regular conditions. Regularly, the driving force applied to shift the spindle nut is significantly stronger than the restoring force of the clutch. This surplus of power is a security factor to ensure engaging and disengaging operations of the clutch under all conditions. This security factor is effectively used under predetermined conditions by reducing the driving force to a second value that holds the clutch in the disengaged state but that is less than the regularly used first value of the driving force.

The term "trigger condition" is used in the sense of a condition that is considered to occur when certain requirements are fulfilled. The trigger condition may, for example, be associated with a specific time period over which the clutch remains disengaged. The control unit measures the time the clutch is in the disengaged state and automatically detects a long-tire disengagement condition of the clutch when the time the clutch is disengaged exceeds a threshold time. The control unit then automatically switches to a "power saving mode" by reducing the output torque of the electric motor and by utilizing the static friction in the clutch actuator system. Other trigger conditions may be associated with operating instructions by the driver or assistance systems of the vehicle. Further, the term trigger condition may also refer to specific conditions of the vehicle, e.g. predetermined driving or stationary conditions, that when the requirements of the condition are fulfilled trigger the control unit to reduce the driving force.

The control unit is configured to activate the electric motor in response to operating commands by an operator, e.g. when the driver of the vehicle presses the clutch pedal. In response to the command input, the control unit actuates the clutch by activating the electric motor such that the electric motor drives the clutch actuator and holds the clutch in the disengaged state with the first value of the driving force. Under specific conditions (trigger conditions), the control unit switches into the power saving mode. For example, when the command input, e.g. the clutch pedal being pressed down, is maintained for a predetermined time, the output driving force is automatically reduced by the control unit.

The threaded spindle preferably comprises an outer helical thread and is in threaded engagement with an inner thread of the spindle nut. Alternatively, the threaded spindle and the spindle nut may form a ball screw unit, wherein balls are provided between an inner rolling groove of the spindle nut and an outer thread of the threaded spindle.

According to further embodiment of the invention, the control unit is configured to perform the following steps:

In a first step, the spindle nut is held in the disengaged position with the first value of the driving force.

In a second step, displacement of the threaded spindle nut is monitored and the driving force of the electric motor is gradually reduced until reaching a threshold value at which the spindle nut begins to displace relative to the threaded spindle, e.g. towards the clutch engaging position, under the restoring force of the clutch, meaning the spindle nut begins to leave the position corresponding to disengagement of the clutch.

In a third step, the driving force of the electric motor is gradually increased above the threshold value so that the spindle nut is stopped and/or returned to the clutch disengaging position.

Preferably, the spindle nut is stopped in a position in which the clutch is still disengaged.

In accordance with a further embodiment of the invention, the control unit may be adapted to determine and save the second value of the driving force of the electric motor for later operations associated with the trigger condition. Accordingly, the system is adaptive and the control unit can adjust the second value in response to changing properties of the clutch or the clutch actuator, e.g. due to increased wear of the clutch. For adjusting the second value, the control unit determines the required value of the driving force for holding the spindle nut so that the clutch remains disengaged and saves this value as second value so that the stored value can be used when the trigger condition occurs again. According to this embodiment, the control unit is configured to perform the following steps:

1. Holding the spindle nut in the disengaged position with the first value of the driving force;
2. monitoring displacement of the threaded spindle or the spindle nut and gradually reducing the driving force until reaching a threshold value of the driving force at which the spindle nut begins to displace relative to the threaded spindle under the restoring force of the clutch;
3. gradually increasing the driving force above the threshold value until the spindle nut is stopped and/or returned to the clutch disengaging position; and
4. saving the value of the driving force required for stopping and/or returning the spindle nut into the clutch disengaging position in a memory as second value for later operations associated with the trigger condition.

Preferably, the value of driving force required for stopping and/or returning the spindle nut into the clutch disengaging position is saved under the condition that the value is lower than the regular clutch actuation driving force (first value).

In accordance with a further embodiment of the invention, a pressure piece may be included that is axially movable between a first and a second position corresponding to engaging and disengaging of the clutch, analogously to the clutch engaging and clutch disengaging position of the spindle nut. The spindle nut and the pressure piece are displaceable relative to each other in an axial direction, and are coupled to each other by a biasing spring interposed between the spindle nut and the pressure piece such that by rotation of the threaded spindle under a driving force of the electric motor, the spindle nut compresses the biasing spring and displaces the pressure piece towards the second position to disengage the clutch.

The features of the herein described clutch actuator with the control unit that is configured to reduce the driving force to a second value in response to a trigger condition may be combined with the features of the herein described clutch actuator with the latching mechanism and the pressure piece to reduce power consumption of the clutch actuator.

Generally, the biasing spring may be provided in a pocket or a recessed section at an end of the spindle nut facing the pressure piece, e.g. in a flange section. In addition or alternatively, the pocket or the recessed section may be provided on the pressure piece, e.g. in a respective flange section thereof facing the spindle nut. The pocket holds the biasing spring in position. Moreover, the pocket arrangement is configured to receive the compressed spring such that the pressure piece and the spindle nut can engage each other directly. Axial force transmitted between the spindle nut and the pressure piece may be transmitted directly through the flange section because the flange section of the spindle nut and the pressure piece engage each other.

BRIEF DESCRIPTION OF THE FIGURES

The invention will now be described referring to exemplary embodiments of the invention shown in the Figures in which

FIG. 3 is another schematic illustration of the clutch actuator of FIG. 1.

FIG. 1 is a schematic illustration of a clutch actuator 1 for engaging and disengaging a clutch (not shown) connected to clutch actuation means in the form of a clutch lever 2 mounted in a vehicle to pivot about a pivot axis 3. The upper section of the clutch lever 2 is coupled to the disengagement bearing of the clutch and by swiveling motion of the clutch lever 2 (indicated by bend arrows), the disengagement bearing of the clutch is displaced to switch between the clutch engaged state and the clutch disengaged state.

Figure 1:
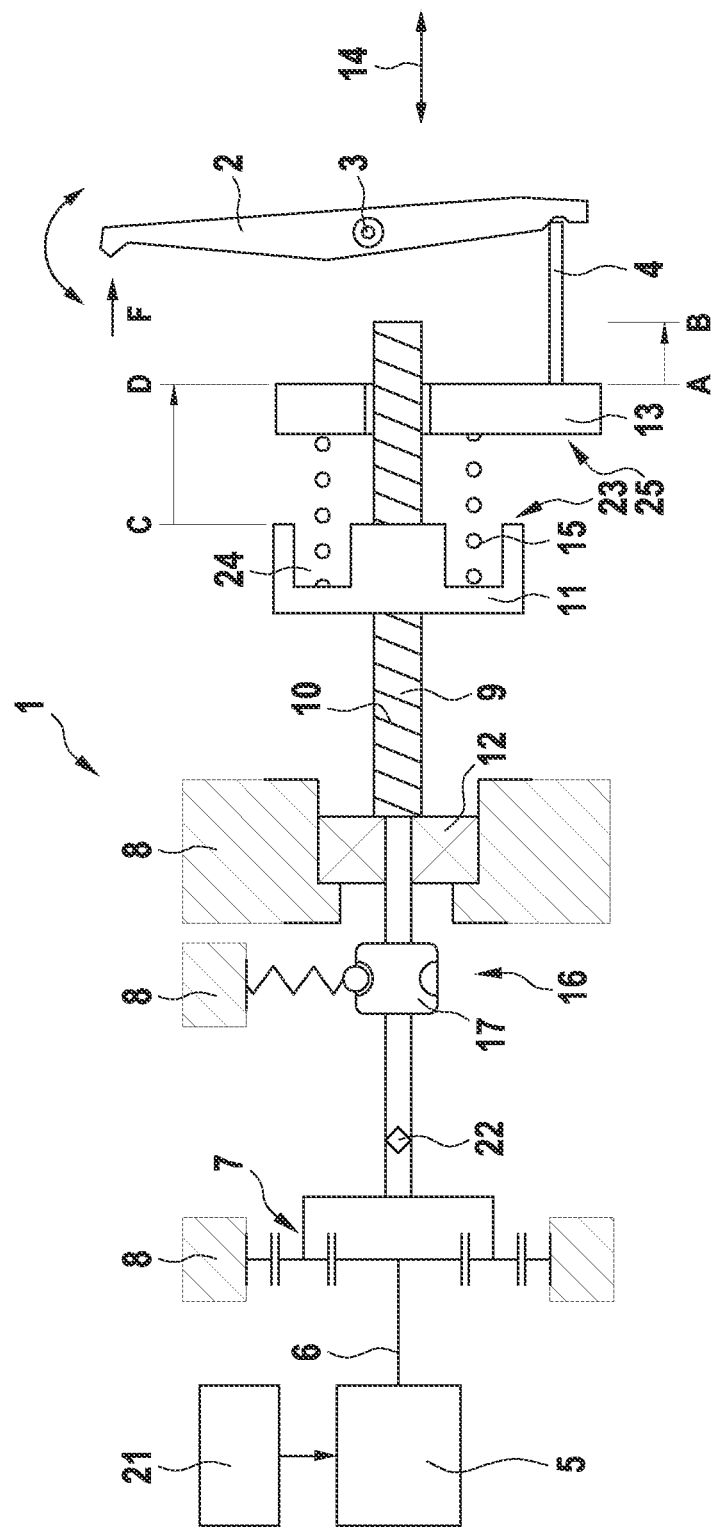
FIG. 1 is a schematic illustration of a clutch actuator.

Swiveling motion of the upper section of the clutch lever 2 to the right (clockwise) engages the clutch. Swiveling motion of the upper section of the clutch lever 2 to the left (counterclockwise) disengages of the clutch. The lower end of the clutch lever 2 is connected to a push-rod 4 serving as a force transmitting element that couples the clutch lever 2 to the clutch actuator 1.

The clutch actuator 1 comprises an electric motor 5 with an output shaft 6 connected to the sun gear of a planetary gear set 7, which is mounted in a housing 8 of the clutch actuator 1. For illustration purposes, only sections of the housing 8 are shown. The planetary gear set 7 is connected with its planet gears to a threaded spindle 9 with an outer thread section 10. On the outer thread section 10 is mounted a spindle nut 11 which has an inner thread meshing with the outer thread 10 of the threaded spindle 9.

The threaded spindle 9 is rotationally supported by a roller bearing 12 mounted in the housing 8. For illustration purposes, only one roller bearing is shown, however, other roller bearings (not shown) are also mounted to support the threaded spindle. The threaded spindle 9 may rotate about is longitudinal axis but is locked against axial displacement. In contrast, the spindle nut 11 is rotatably fixed relative to the housing 8 by a longitudinal guidance (not shown) provided in the housing so that the spindle nut 11 is axially displaceable in the housing 8 but locked against rotation. Rotation of the threaded spindle 9 under the driving force provided by the electric motor 5 and transmitted through the planetary gear set 7 drives the spindle nut 11 in axial direction along the threaded spindle 9.

The clutch actuator 1 further comprises a pressure piece 13 in the form of a plunger, which extends about the threaded spindle 9 but which is not engaged with the threaded spindle as the spindle nut 11. The pressure piece 13 is displaceable in axial direction 14 along the longitudinal axis of the threaded spindle 9, analogously to the spindle nut 11, wherein the pressure piece 13 is also guided in axial direction by a linear guidance (not shown) in the housing 8.

The pressure piece 13 is further connected to the push-rod 4. When the pressure piece 13 is displaced in axial direction 14, along the axis of the threaded spindle 9, it displaces the push-rod 4 which, in turn, actuates the clutch lever 2 to rotate the same about the pivot axis 3.

Pressure piece 13 and spindle nut 11 are movable relative to each other in the axial direction 14 so that the spindle nut 11 and the pressure piece 13 may approach each other and may move away from each other. A biasing spring 15 is interposed between the spindle nut 11 and the pressure piece 13 and couples the two elements with each other. The spindle nut 11 has at one end facing the pressure piece 13 a flange section 23 with a pocket 24 in the form of a recessed portion. The biasing spring 15 is inserted into the recess portion 24 and extends toward the pressure piece 13. The pressure piece 13 has in correspondence to the spindle nut 11 a flange section 25 that faces the flange section 23 of the spindle nut 11. In the illustrated embodiment, the flange section 25 of the pressure piece 13 is flat. Alternatively, the recess portion 24 may be provided on the flange section 25 or both flange sections 23 and 25 may be provided with a recess portion to receive a respective end of the biasing spring 15.

As indicated above, the position of the pressure piece 13 is linked to the condition of the clutch. The pressure piece 13 is axially moveable relative to the threaded spindle 9 between a first position A corresponding to the engaged state of the clutch and a second position B that corresponds to the disengaged state of the clutch. Similar, the spindle nut 11 is axially moveable relative to the threaded spindle 9 between a clutch engaging position C corresponding to the engaged state of the clutch and a second position D corresponding to the disengaged state of the clutch. The displacements between the positions A-B and C-D is respectively indicated by an arrow.

FIG. 1 illustrates the clutch actuator in a state that corresponds to the clutch engaged state. The clutch (not shown) has a clutch spring (not shown) which exerts a restoring force against the clutch lever, indicated by F, upon actuation of the clutch. When the electric motor 5 provides a driving force and rotates the threaded spindle 9 in a first direction, the spindle nut 11 is displaced in axial direction due to the thread engagement with the driving threaded spindle 9, approaches the pressure piece 13 and begins to compress the biasing spring 15 and then to displace the pressure piece 13 from position A to position B against the restoring force of the clutch. As the biasing spring 15 is being compressed into the recess portion 24, the spindle nut 11 approaches the pressure piece 13 until the flange section 23 of the spindle nut 11 engages the flange section 25 of the pressure piece 13 so that axial force is directly transmitted via the flange sections 23 and 25. The pressure piece 13 displaces the push rod 4 and the clutch lever 2 is rotated counterclockwise against the restoring force F of the clutch spring to disengage the clutch. In the disengaged state of the clutch, the restoring force of the clutch acts against the driving torque of the electric motor 5 on the threaded spindle 9 through the push rod 4, the pressure piece 13, the biasing spring 15 and the spindle nut 11.

When the driving force is reduced below a predetermined level, the clutch lever 2 begins to rotate in clockwise direction and the pressure piece is moved backward from position B to position A and the spindle nut 11 is moved backward toward position C. Displacement of the spindle nut 11 toward position C rotates the spindle 11 and causes rotation of the threaded spindle 9. When the pressure piece 13 has reached position A the biasing spring expands and displaces the spindle nut 11 away from the pressure piece 13 toward position C.

In order to prevent displacement of the spindle nut beyond position C and full relaxation of the biasing spring 15, a latching mechanism 16 is provided to limit displacement of the spindle nut 11 away from the pressure piece 13 under the force of the expanding biasing spring 15 and to hold the biasing spring in a preloaded state.

Figure 2:
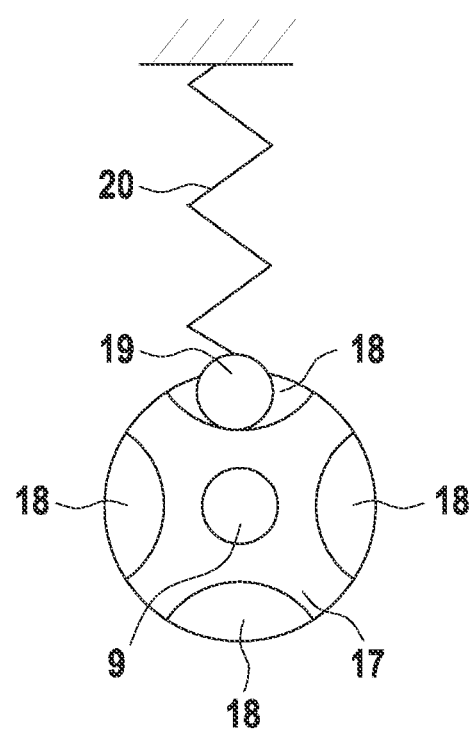
FIG. 2 is detailed view of a section of the clutch actuator in FIG. 1

FIG. 2 shows in cross section the latching mechanism 16 in a cross-sectional view along the axial direction 14. The latching mechanism comprises a disc 17 attached to the threaded spindle 9 in a rotatably fixed manner. The disc 17 is provided with a number of detent recesses 18 on its outer circumferential surface. A spring biased detent cam 19 is urged into engagement with detent disc 17 by means of a spring element 20. When the threaded spindle 9 rotates, the detent cam moves from one detent recess 18 into the adjacent detent recess 18. When the driving force of the electric motor is reduced under predetermined value and the detent cam 19 is engaged with one of the detent recesses 18, the spring force provided by the spring element 20 retains the threaded spindle 9 against rotation under the force of the biasing spring 15. As further rotation of the threaded spindle 9 is prevented, the spindle nut 11 is prevented from further displacement away from the pressure piece 13 so that the biasing spring 15 is not allowed to fully expand and is held in pre-load state. Thereby, the disengagement bearing of the clutch is loaded with a preload when the spindle nut 11 is in the clutch engaging position. Further, when the vehicle is turned off and the electric motor is not energized, the spindle nut remains in that position.

The electric motor is activated by the control unit 21 which can adjust the output driving force of the electric motor. The threaded spindle is further provided with an absolute rotary encoder 22, e.g. a magnet element of a Hall-effect sensor. The corresponding sensor part is mounted on the housing but not shown.

FIG. 3 shows the clutch actuator in a state corresponding to the disengaged stated of the clutch. The pressure piece 13 is in the second position B corresponding to the disengaged state of the clutch and the spindle nut 11 is in the clutch disengaging position D. The biasing spring 15 between the spindle nut 11 and the pressure piece 13 is compressed and the restoring force of the clutch acts on the pressure piece and through the compressed spring and the spindle nut 11 as an axial load on the threaded spindle 9. The biasing 15 is fully compressed and received in the recess portion 24. Due to the recess portion 24, the flange section 23 of the spindle nut 11 is in engagement with the flange section 25 of the pressure piece 13.

The roller bearing 12 is of the type that supports radial and axial loads applied to the threaded spindle 9. The clutch is held in the disengaged state and the spindle nut 11 and the pressure piece 13 are retained in positions D, B by a driving force having a first value. The control unit 21, which controls the electric motor 5, is configured to measure the time the clutch is in the disengaged state. For that purpose, the above described rotary encoder may be used to provide the control unit with information if the spindle nut is in the clutch engaging or the clutch disengaging position and an internal timer of the control unit may measure the time. When a predetermined time has lapsed without the clutch reengaging, the control unit considers this condition to be a trigger condition that triggers a specific action by the control unit. The trigger control unit begins to reduce the driving force to a second value that is lower than the first value but that is above a threshold value at which the spindle nut leaves its position and begins to moves along the threaded spindle under the restoring force of the clutch.

Even though the driving force is reduced to the second value, the threaded spindle 9 remains stationary. This is due to the fact that the restoring force of the clutch exerts an axial load through spindle nut 11 into the threaded spindle 9 and into the roller bearing 12. As the components of the clutch actuator are stationary, the roller bearings as well as other sections of the clutch actuator, e.g. the meshed engagement between the spindle nut and the threaded spindle, generate static friction. This static friction assists the driving force in providing a counter force against the restoring force of the clutch and the control unit may reduce the driving force to a second value which is lower than the first value of the driving force whilst the clutch actuator components remain stationary. Thereby, energy consumption is significantly reduced.

REFERENCE NUMERALS 1 clutch actuator
2 clutch lever
3 pivot axis
4 push-rod
5 electric motor
6 shaft
7 planetary gear set
8 housing
9 threaded spindle
10 outer thread
11 spindle nut
12 roller bearing
13 pressure piece
14 axial direction
15 biasing spring
16 latching mechanism
17 detent disc
18 detent recess
19 detent cam
20 spring element
21 control unit
22 rotary encoder
23 flange section of spindle nut
24 recess portion
25 flange section of pressure piece
A first position of pressure piece
B second position of pressure piece
C clutch engaging position of spindle nut
D clutch disengaging position of spindle nut

The invention claimed is:

1. An electrically driven clutch actuator for actuating a clutch of a transmission of a vehicle, comprising:
a pressure piece that is axially movable between a first position and a second position corresponding to engaging and disengaging of the clutch, respectively, wherein the pressure piece is driven from the first position into the second position by a spindle drive that comprises a threaded spindle rotationally driven by an electric motor, and a spindle nut mounted on the threaded spindle and being axially displaceable by rotation of the threaded spindle;
wherein the spindle nut and the pressure piece are displaceable relative to each other in an axial direction, and are coupled to each other by a biasing spring interposed between the spindle nut and the pressure piece such that by rotation of the threaded spindle under a driving force of the electric motor, the spindle nut compresses the biasing spring and displaces the pressure piece towards the second position to disengage the clutch,
wherein when the driving force provided by the electric motor is reduced below a predetermined level, the pressure piece is returned to the first position by the restoring force of the clutch and the biasing spring expands to displace the spindle nut away from the pressure piece,
wherein a latching mechanism that is configured to limit displacement of the spindle nut away from the pressure piece under the force of the expanding biasing spring such that the biasing spring is held in a preload state, the latching mechanism comprises first latching means and second latching means, wherein the first latching means are firmly connected to the rotatable threaded spindle or the axially displaceable spindle nut.

2. The clutch actuator according to claim 1, wherein the latching mechanism comprises a detent recess and a detent lug, wherein one of the detent recess and the detent lug is biased in the direction of engagement with the other of the detent recess and the detent lug.

3. The clutch actuator according to claim 1, wherein the latching mechanism comprises a detent portion that is firmly connected to or provided on the threaded spindle and that has at least one detent recess, preferably more than one detent recess, on its outer circumferential surface to retain the threaded spindle in a rotational position by engagement with a detent lug.

4. The clutch actuator according to claim 1 further comprising a sensor arrangement to detect the rotational position of the threaded spindle and/or the axial position of the spindle nut and/or the axial position of the pressure piece.

5. The clutch actuator according to claim 4, wherein the sensor arrangement includes a rotary encoder to detect rotations of the threaded spindle.

6. The clutch actuator according to claim 1, wherein the latching mechanism is releasable by the driving force provided by the electric motor.

7. An electrically driven clutch actuator for actuating a clutch of a transmission of a vehicle, comprising:
a threaded spindle supported by one or more roller bearings and rotationally driven by an electric motor,
a spindle nut mounted on the threaded spindle and being axially displaceable by rotation of the threaded spindle from a clutch engaging position into a clutch disengaging position corresponding to engaging and disengaging of the clutch, respectively, against a restoring force of the clutch, and
a control unit for activating the electric motor to apply a driving force to the threaded spindle, wherein the control unit is configured to hold the spindle nut in the clutch disengaging position with a first value of the driving force,
wherein the control unit is configured to, when the spindle nut is held in the clutch disengaging position with the first value of the driving force, reduce the driving force in response to a trigger condition sensed by the control unit to a second value, the second value of the driving force being above a threshold value at which the spindle nut moves toward the clutch engaging position.

8. The clutch actuator according to claim 7, wherein the control unit is configured to adjust the driving force of the electric motor.

9. The clutch actuator according to claim 7, wherein the trigger condition is associated with predetermined driving or stationary conditions of the vehicle.

10. The clutch actuator according to claim 7, wherein the trigger condition is a specific period of time over which the clutch remains disengaged.

11. The clutch actuator according to claim 7, wherein the control unit is configured to perform the steps of:
   1) holding the spindle nut in the clutch disengaging position with the first value of the driving force;
   2) monitoring displacement of the threaded spindle or the spindle nut and gradually reducing the driving force until reaching a threshold value of the driving force at which the spindle nut begins to displace relative to the threaded spindle under the restoring force of the clutch;
   3) gradually increasing the driving force above the threshold value until the spindle nut is stopped and/or returned to the clutch disengaging position.

12. The clutch actuator according to claim 11, wherein the control unit determines the second value of the driving force of the electric motor by performing the steps 1-3 and saving the value of the driving force required for stopping and/or returning the spindle nut into the clutch disengaging position in a memory as second value for later operations of the clutch associated with the trigger condition.

13. The clutch actuator according to claim 7, wherein a pressure piece is provided that is axially movable between a first position and a second position corresponding to engaging and disengaging of the clutch, respectively,
   wherein the spindle nut and the pressure piece are displaceable relative to each other in an axial direction, and are coupled to each other by a biasing spring interposed between the spindle nut and the pressure piece such that by rotation of the threaded spindle under a driving force of the electric motor, the spindle nut compresses the biasing spring and displaces the pressure piece towards the second position to disengage the clutch.

14. The clutch actuator according to claim 13, wherein the biasing spring is provided in a recess portion of the spindle nut and/or the pressure piece such that the spindle nut makes contact with the pressure piece when the biasing spring is compressed.

15. The clutch actuator according to claim 5, wherein the rotary encoder is an absolute encoder to detect absolute rotations of the threaded spindle.

\* \* \* \* \*